Aug. 21, 1951     G. COLEMAN ET AL     2,564,802
MANUFACTURE OF CLUSTER HOB NAILS
Filed March 29, 1949
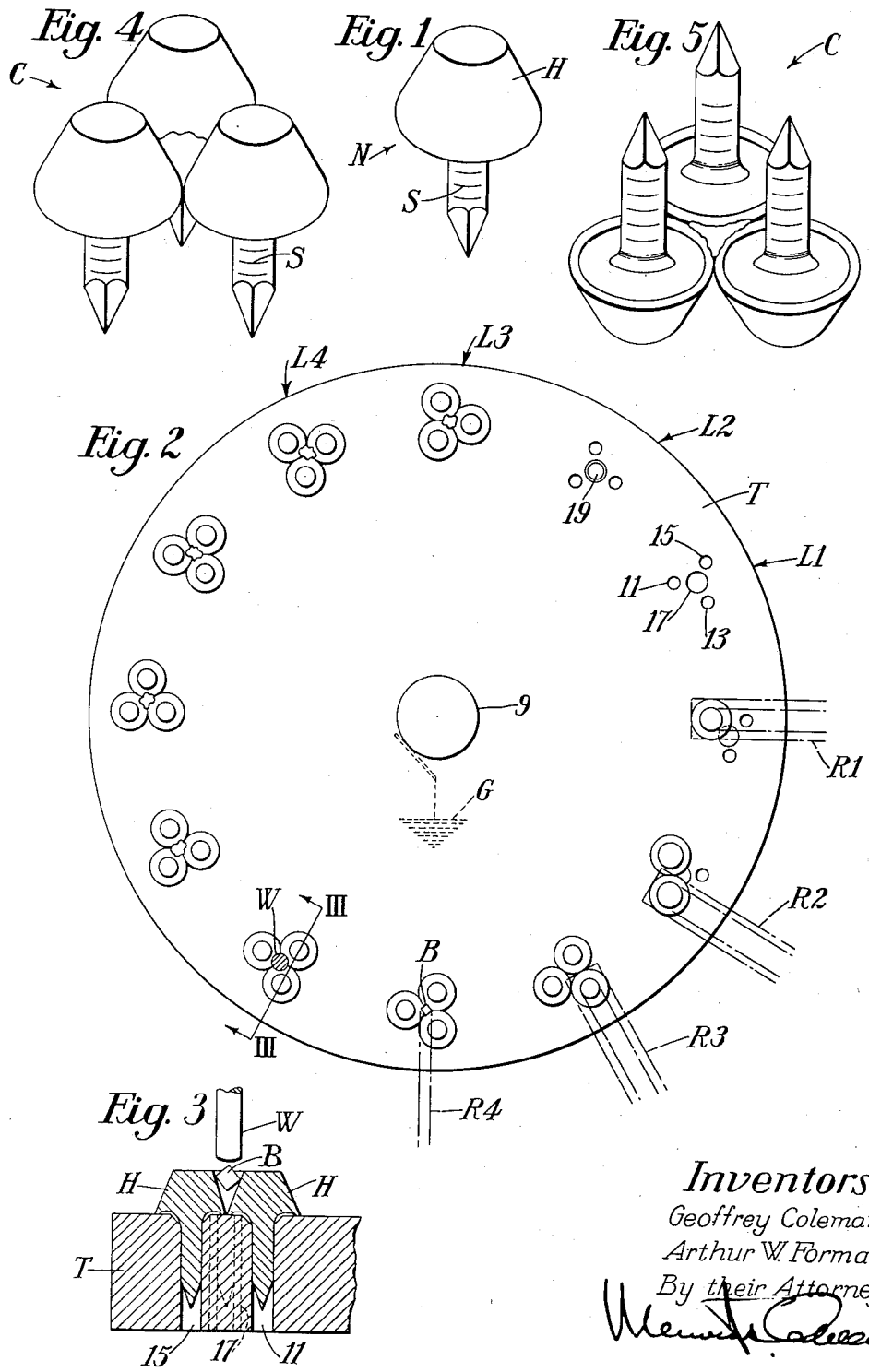
Inventors
Geoffrey Coleman
Arthur W. Forman
By their Attorney Patented Aug. 21, 1951

2,564,802

UNITED STATES PATENT OFFICE 2,564,802

MANUFACTURE OF CLUSTER HOBNAILS

Geoffrey Coleman and Arthur W. Forman, Leicester, England, assignors to United Shoe Machinery Corporation, Flemington, N. J., a corporation of New Jersey Application March 29, 1949, Serial No. 84,049
In Great Britain April 14, 1948

1 Claim. (Cl. 219—10)

This invention relates to the manufacture of hob nails and is herein disclosed as exemplified in a method of making articles known as cluster hobs. Such articles consist of assemblies of individual hob nails having parallel shanks and having their heads joined together at their peripheries. Although hob nails are ordinarily cold-forged from wire stock by high speed automatically operating machines, it is not practicable to make cluster hobs in this manner. Until now, the manufacture of cluster hobs has proved more expensive and slower than the manufacture of an equivalent number of individual hobs.

It is an object of the present invention to provide an improved method of making cluster hobs. In accordance with a feature of the invention, a cluster hob is made by welding together the heads of a plurality of individual hob nails. Such individual hob nails, in accordance with the method disclosed herein, are formed in the usual manner by cold-forging from wire stock. The individual hob nails are positioned and electrically grounded with the head of each nail adjacent to the heads of the other nails, whereupon an electric welding rod is applied to cause the adjacent nail heads to be welded to each other. The positioning of the hob nails is effected by inserting their stems into suitably spaced holes in an electrically grounded plate. While the welding is taking place, molten metal from the welding rod unites with the fused metal of the adjacent edges of the nail heads to form an effective bond between the nails. If an unusually strong bond is desired, a small billet of welding metal may be introduced into the central hollow between the three frusto-conical nail heads before the welding rod is applied. After the nail heads have been welded together, the resulting cluster is allowed to cool and is then ejected from the plate by a thrust applied centrally of the cluster. The plate, above mentioned, may conveniently be in the form of a turntable which is rotated through various stations at which the individual nails are positioned, the billet of welding metal is introduced, the welding rod is applied, and the ejection takes place.

These and other features of the invention are illustrated in the accompanying drawings and hereinafter described and claimed.

Referring to the drawings,

Fig. 1 is a perspective view of a hob nail which has been made from wire stock by cold-forging;

Fig. 2 is a diagrammatic plan view of an apparatus used in carrying out the novel method, above referred to, for making cluster hobs;

Fig. 3 is a sectional view taken along the line III—III of Fig. 2; and

Figs. 4 and 5 are perspective views, showing, in different positions, a cluster hob made in accordance with said improved method.

In Fig. 1 is shown an individual hob nail N having a cylindrical shank $\frac{7}{16}$ of an inch long terminating at one end in a point and at the other in a large head H. Serrations S are formed on the shank of the nail. The head H is frusto-conical having a large diameter of $\frac{5}{16}$ of an inch and a thickness of $\frac{3}{16}$ of an inch.

In carrying out our improved method, a supply of hob nails N is made from wire stock by cold-forging. These nails are fed to an apparatus shown in Fig. 2 from three nail-pots (not shown) by three respective raceways R1, R2, and R3. The nail-pots are provided with the usual means for separating individual nails from the mass and introducing them into the raceways one behind the other in a line with the heads uppermost.

The device shown in Fig. 2 includes a turntable T mounted on a central spindle 9 and electrically grounded as indicated by the reference character G. The turntable T has twelve equally spaced locations L1, L2, L3, etc., near its periphery and at each location there is a group of three cylindrical holes 11, 13, and 15 arranged in the form of an equilateral triangle with the hole 11 of each group being nearest the spindle 9, the hole 15 furthest from the spindle 9, and the hole 13 at an intermediate distance. The holes 11, 13, and 15 have diameters which enable the shanks of the nails N to fit in them with slight clearance, and they are so spaced that when three nails N are placed in the holes at any one location, the head of each nail will just touch the heads of the other two. The turntable T is turned step-by-step through 30° at a time by mechanism of the Geneva movement type, with a rest period or dwell between successive steps of rotation.

During each dwell, some one of the twelve locations will occupy a position wherein the raceway R1 can feed a nail N to the hole 11 of that location. The turntable T is thereupon turned through 30° and stopped with said location in such a position that another nail N can be fed along the raceway R2 and deposited into the hole 13. The turntable T is again rotated through 30° and stopped in such a position as to enable a third nail N to be deposited in the hole 15 from the raceway R3. The turntable is then turned through another step of rotation to bring the central space of the triangle defined by the three nails N into position to receive, during the dwell, a small billet B of welding material from a fourth raceway R4. The turntable is then turned through still another step of rotation to bring the center of said triangle under a welding rod W and, while the turntable is stationary, the welding rod is lowered into operative position to cause the heads of the three nails and the billet B to be welded together to form a cluster hob C as shown in Figs. 4 and 5. After further steps of rotation, which allow time for the cluster hob to cool, a cam-operated ejecting rod 19 rises from below the turntable through a hole 17 formed in the turntable T centrally of said triangle and ejects the cluster hob.

The cycle of operations described above is repeated indefinitely, with the supplying of nails to the holes of three successive locations, the supplying of the billet B to the nails at a fourth location, the application of the welding rod W at a fifth location, and the ejection of the welded cluster C from still another location, all taking place simultaneously.

The manufacture of cluster hobs by the above described method is less expensive than by casting, and the cold-forged individual hob nails are believed to be tougher and stronger than cast hob nails. Moreover, the serrations S, which can easily be formed in cold-forged nails, would prevent withdrawal from the mold if formed in cast hob nails.

Having thus described our invention, what we claim as new and desire to secure by Letters Patent of the United States is:

The method of making a cluster hob which consists in arranging three hob nails in the form of an equilateral triangle with the head of each nail in proximity to the heads of the other two nails and with the stems of the nails substantially parallel, electrically grounding the three nails, holding the three nails so arranged and grounded, introducing a billet of welding metal into the space between the three nail heads, and applying an electric welding current to the nail heads to cause the central space between them to be closed by metal which joins them into a cluster.

GEOFFREY COLEMAN.
ARTHUR WALTER FORMAN.

REFERENCES CITED

The following references are of record in the file of this patent:

UNITED STATES PATENTS

| Number | Name | Date |
|---|---|---|
| 379,453 | De Benardos | Mar. 13, 1888 |
| 1,188,868 | White | June 27, 1916 |
| 1,774,867 | Booth | Sept. 2, 1930 |
| 2,321,068 | De Witt et al. | June 8, 1943 |
| 2,348,087 | Miller | May 2, 1944 |
| 2,441,176 | Wilson et al. | May 11, 1948 |